US012681867B2

(12) United States Patent
Li

(10) Patent No.: US 12,681,867 B2
(45) Date of Patent: Jul. 14, 2026

(54) CACHE EVICTION IN A MULTI-TENANT ARCHITECTURE

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/948,832

(22) Filed: Nov. 15, 2024

(65) Prior Publication Data

US 2026/0140888 A1    May 21, 2026

(51) Int. Cl.
G06F 12/121         (2016.01)
(52) U.S. Cl.
CPC .................................. G06F 12/121 (2013.01)
(58) Field of Classification Search
CPC ...................................................... G06F 12/121
See application file for complete search history.

(56) References Cited

U.S. PATENT DOCUMENTS

| | | | | |
|---|---|---|---|---|
| 9,892,044 B1* | 2/2018 | Wallace | ................ | G06F 12/121 |
| 12,050,534 B1* | 7/2024 | Uthaman | .............. | G06F 9/5016 |
| 2017/0004093 A1* | 1/2017 | Susarla | .............. | G06F 11/3055 |
| 2023/0068779 A1* | 3/2023 | Fasfous | .............. | G06F 12/0891 |
| 2023/0135316 A1* | 5/2023 | Wojcik | ................ | G06F 12/0802 |
| | | | | 707/769 |

\* cited by examiner

*Primary Examiner* — Prasith Thammavong
(74) *Attorney, Agent, or Firm* — Buckley, Maschoff & Talwalkar LLC

(57) ABSTRACT

Systems and methods include storage of a plurality of objects in a cache, determination, for each of the plurality of objects, of a value based on a quality of service level associated with a tenant to which the object belongs and on at least one time at which the object was accessed from the cache, determination of one of the plurality of objects to delete from the cache based on the determined values, and deletion of the determined one of the plurality of objects from the cache.

15 Claims, 5 Drawing Sheets

200

| Tenant | QoS |
|--------|-----|
| T123 | 1 |
| T56 | 5 |
| T221 | 2 |

| Object | LastAccess | AccessFreq | LoadTime | WeightedCost |
|--------|-----------|-----------|----------|--------------|
| obj1 | 8:00:43 | 49 | 1s | 247 |
| obj2 | 8:00:44 | 50 | 1s | 153 |
| obj3 | 7:59:54 | 50 | 1s | 202 |
| obj4 | 8:00:44 | 100 | 1s | 307 |

FIG. 3

CACHE EVICTION IN A MULTI-TENANT ARCHITECTURE

BACKGROUND

Multi-tenancy is a software architecture pattern which facilitates the sharing of computing resources (e.g., processor cycles, memory) among disparate groups of users. For example, a single multi-tenant application may serve requests received from several independent tenants (e.g., customers) each consisting of multiple end users. Such an application may use a much smaller computing resource footprint than would be required to provision one application per tenant.

Multi-tenant applications use various hardware and/or software-driven schemes to allow the sharing of computing resources between tenants while maintaining tenant-specific data isolation. Multi-tenant applications can be cloud-based (e.g., a Software-as-a-Service (SaaS) application) in order to take advantage of the resource elasticity, redundancy, economies of scale and other benefits provided by cloud platforms.

Different tenants sign different SLAs (Service Level Agreements) with application providers. The different SLAs may guarantee different levels of QoS (Quality of service) for the different tenants. For example, a tenant which has been guaranteed a higher level of QoS should receive better service from the application than a tenant which has been guaranteed a lower level of QoS. Service quality may be measured in terms of throughput, availability, response time lag, etc.

Since all tenants of a multi-tenant application share computing resources, it can be difficult to provide the tenants with different levels of QoS. Systems are desired to efficiently provide different QoS levels to the different tenants of a multi-tenant application.

BRIEF DESCRIPTION OF THE DRAWINGS

FIG. 2 is a tabular representation of tenant-specific Quality of Service information according to some embodiments.

FIG. 3 is a tabular representation of cache statistics according to some embodiments.

DETAILED DESCRIPTION

The following description is provided to enable any person in the art to make and use the described embodiments. Various modifications, however, will remain readily-apparent to those in the art.

The present inventor has identified the shared cache as an important performance bottleneck in a multi-tenant system. Increasing the cache size to remove this bottleneck is typically not viable in view of the high cost of the memory used for caches.

Generally, an application requiring an object attempts to fetch the object from a cache. If the object is stored in the cache, it is returned to the program therefrom. If the cache does not store the object, an error (i.e., a cache miss) is returned and the application fetches the object from another storage (e.g., a database, a file system, or a remote source). The application then attempts to store the object in the cache. If the cache has insufficient available capacity, objects are evicted from the cache until enough capacity is available to store the object. The objects to be evicted from the cache may be determined based on known eviction algorithms such as but not limited to Least-Recently Used, Least-Frequently Used, and First-In-First-Out.

Embodiments implement a cache eviction algorithm which results in the provision of different QoS levels to different tenants. A cache eviction algorithm according to some embodiments improves performance for higher-level QoS tenants by providing those tenants with a cache hit rate (i.e., a percentage of objects requested from the cache which are actually stored in cache) that is higher than a cache hit rate of tenants having a lower QoS level. Read/write operations on objects stored in a cache are much faster than read/write operation on objects stored on disk and other storage.

A cache eviction algorithm according to some embodiments identifies object to evict from a cache based on respective costs calculated for each object in the cache. The cost of an object may depend in part on a QoS level associated with a tenant to which the object belongs. The cost may also depend, in some embodiments, on a time since the object was last accessed, an access frequency of the object, a time required to load the object into the cache from other storage and/or other factors.

Figure 1:
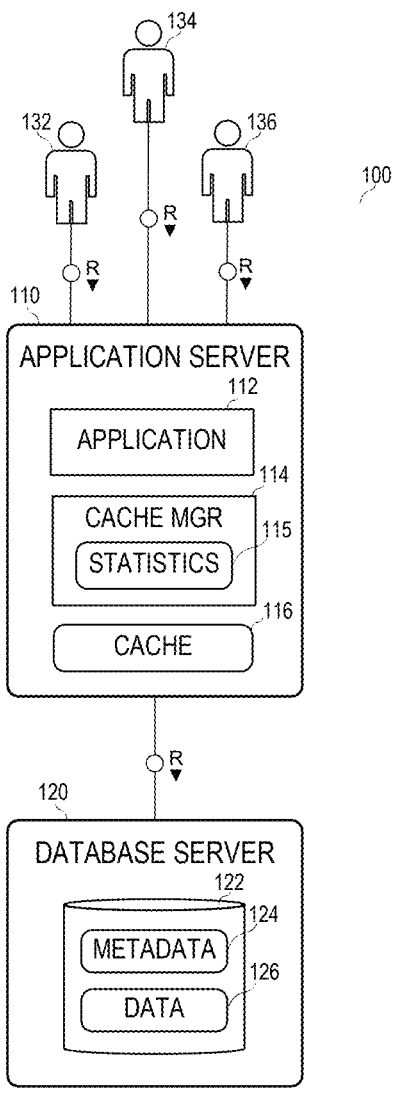
FIG. 1 illustrates a multi-tenant system providing tenant-based cache eviction according to some embodiments.

FIG. 1 illustrates a system according to some embodiments. The illustrated components of FIG. 1 may be implemented using any suitable combinations of computing hardware and/or software that are or become known. The components of system 100 may be on-premise, cloud-based (e.g., in which computing resources are virtualized and allocated elastically), distributed (e.g., with distributed storage and/or compute nodes) and/or deployed in any other suitable manner. Each of servers 110 and 120 may comprise one or more servers, virtual machines, clusters of a container orchestration system and any other combination that is or becomes known. All or a part of each system may utilize Infrastructure-as-a-Service (IaaS), Platform-as-a-Service (PaaS) and/or Software-as-a-Service (SaaS) offerings owned and managed by one or more different entities as is known in the art.

Application server 110 may provide an operating system, services, I/O, storage, libraries, frameworks, etc. to applications executing therein. Application 112 may comprise program code executable by a processing unit of application server 110 to provide functions based on coded logic and data. Application 112 may provide any computing functions that are or become known.

Application server 110 also includes cache manager 114 and cache 116. Cache manager 114 may comprise program code which may be executed to, among other functions, determine objects to evict from cache 116. Cache 116 may be implemented by any one or more memory devices from which a processing unit of server 110 may quickly access data, for example due to the inherent speed of the memory device, the speed of a connection between the processing unit and the memory device, and/or the distance between the processing unit and the memory device. Examples of cache 116 include but are not limited to high-speed static random-access memory. Cache 116 may include L1, L2 and/or L3 processor memory.

Cache manager 114 may determine objects to evict from cache 116 based on statistics 115. Cache manager 114 may determine and store statistics 115 based on the storage of objects in cache 116 during operation of application 112. Statistics 115 may identify objects currently stored in cache 116 and may specify, for each stored object, a time at which the object was last accessed, a frequency with which the object has been recently accessed, a time required to load the object into the cache from other storage, and a weighted cost of the object. The weighted cost of an object depends in part on a QoS level associated with a tenant to which the object belongs. Cache manager 114 may determine the weighted costs periodically and use the weighted costs to determine objects to evict from cache 116 as will be described below.

Application 112 accesses database 122 of database server 120 during operation. Database 122 stores metadata 124 which describes the structure and interrelationships (i.e., the schema) of data 126. Data 126 may comprise tenant data as well as other data used by application 110. Data 126 may comprise tabular data stored in a columnar or row-based format, object data or any other type of data that is or becomes known. An object as described herein may comprise any logical group of data, including object data and data of one or more table rows. Metadata 124 and data 126 may be stored by application server 110 in some embodiments.

Database 122 may be multi-tenant aware, serving requests based on the tenant associated with the request. In a case that database 122 is not multi-tenant aware, one schema of a single instance may be used for all tenants, where the data of each tenant is partitioned via a discriminating column. Multi-tenant application 112 is therefore responsible for tracking and managing the data in a tenant-aware manner, for example by using the values of the discriminating column to identify the data belonging to specific tenants.

Database 122 may be implemented using one or more storage systems, each of which may be standalone or distributed, on-premise or cloud-based. Database 122 may comprise any type of database, data warehouse, object store, or other storage system that is or becomes known.

Users 132, 134, 136 may operate respective user devices (not shown) to interact with application 112. Such user devices may execute Web browsers which request user interfaces from application 112 and present the user interfaces to users 132, 134, 136. The user devices may access application 112 via a gateway (not shown) which routes requests to application 112 and may also provide authentication, authorization, and load balancing.

Users 132, 134, 136 may be associated with different respective tenants. Each tenant may be a party to a distinct subscription/agreement/contract with a provider of application 112. Each tenant may therefore be associated with a different QoS level.

FIG. 2 is a tabular representation of tenant-specific QoS information 200 according to some embodiments. Each of tenants T123, T56 and T221 is associated with a different level (or grade) of QoS. The levels may be determined based on an agreement between the tenants and the application provider as is known in the art. Embodiments are not limited to any particular number or gradations of levels. For purposes of the present example, it will be assumed that user 132 belongs to tenant T123, user 134 belongs to tenant T56, and user 136 belongs to tenant T221. Information 200 may be stored in cache 116, data 134 and/or in any other suitable memory.

Application 112 serves incoming requests based on the tenants underlying the requests. In particular, application 112 serves a request received from a user of a particular tenant based on the tenant's data stored in database 122

(and/or cache 116) and in view of the QoS level associated with the tenant. If an object is requested, application 112 determines whether the object is in cache 116 and, if not, retrieves the object from database 122 and stores the object in the cache. The object remains in the cache until it is evicted.

Cache manager 114 maintains and updates statistics 115 during operation of application 112. FIG. 3 is a tabular representation of cache statistics 115 according to some embodiments. Each object of cache statistics 115 may be currently stored in cache 116 and may belong to any tenant served by application 112. For each object in cache 116, statistics 115 stores a time at which the object was last accessed (LastAccess), a frequency with which the object has been accessed within a recent time window (AccessFreq), a time required to load the object into the cache from its persistent storage (LoadTime), and a weighted cost of the object (WeightedCost). Each of these values is monitored and/or calculated by cache manager 114.

The weighted costs of each object in cache 116 may be periodically determined based on the other fields of statistics 115 and on the QoS level associated with the tenant to which the object belongs. According to some embodiments, the weighted cost $cost_w$ is determined as:

$$cost_w = e^{\gamma \cdot (qos - MAX\_QOS)} \cdot Max\left(1 - \frac{\Delta \text{ time}}{MAX\_IDL\_TIME}, 0\right) \cdot freq \cdot loadTime,$$

where qos is the QoS level associated with the tenant to which the object belongs. MAX_QOS is a positive constant and is the maximum QoS level provided by the system, and qos may comprise an integer in between [1, MAX_QOS]. $\Delta$time is the time difference between the current timestamp and the timestamp at the last access of the object (i.e., LastAccess). LoadTime represents the time required to load the object from its persistent storage (e.g., database 122). LoadTime can be determined from historical operation data. freq is the number of times the object has been fetched in the prior in the current time window, where the current time window is an adjustable parameter. MAX_IDL_TIME and $\gamma$ are also adjustable parameters, in which MAX_IDL_TIME is a maximum time for which an object should remain in the cache without being fetched and $\gamma$ is a QoS importance factor with $\gamma \geq 0$. The bigger $\gamma$ is, the more important the QoS level is to the weighted cost.

$e^{\gamma \times (qos - MAX\_QOS)}$ is the weighting factor for QoS in the above formula for $cost_w$. When qos=MAX_QOS, the weighting factor has its maximum value of 1. $cost_w$ is directly related to the values of freq, loadTime and qos, and inversely related to $\Delta$time.

In one example, statistics 115 associate two objects with the same values of freq, $\Delta$time, and loadTime. One of the objects belongs to tenant1 with QoS level $qos_1$ and the other object belongs to tenant2 with QoS level $qos_2$, and $\Delta qos = qos_1 - qos_2 > 0$. The ratio between the weighted cost of tenant1's object and the weighted cost of tenant2's object is $$ratio_{1,2} = \frac{cost_{w,1}}{cost_{w,2}} = \frac{e^{\gamma \cdot (qos - MAX\_QOS)}}{e^{\gamma \cdot (qos - MAX\_QOS)}} = e^{\gamma \cdot \Delta qos}, \Delta qos > 0$$

As $\gamma$ increases, $ratio_{1,2}$ increases. Accordingly, QoS levels become more important in determining $cost_w$ as $\gamma$ increases. If $\gamma$=0, the QoS level is not relevant to the determination of $cost_w$.

Embodiments are not limited to the above calculation of $\text{cost}_w$. For example, a calculation which does not account for LoadTime may be:

$$\text{cost}_w = e^{\gamma \cdot (qos - MAX\_QOS)} \cdot \text{Max}\left(1 - \frac{\Delta \text{ time}}{MAX\_IDL\_TIME}, 0\right) \cdot freq$$

The influence of freq may also be ignored in some embodiments as follows:

$$\text{cost}_w = e^{\gamma \cdot (qos - MAX\_QOS)} \cdot \text{Max}\left(1 - \frac{\Delta \text{ time}}{MAX\_IDL\_TIME}, 0\right)$$

Figure 4:
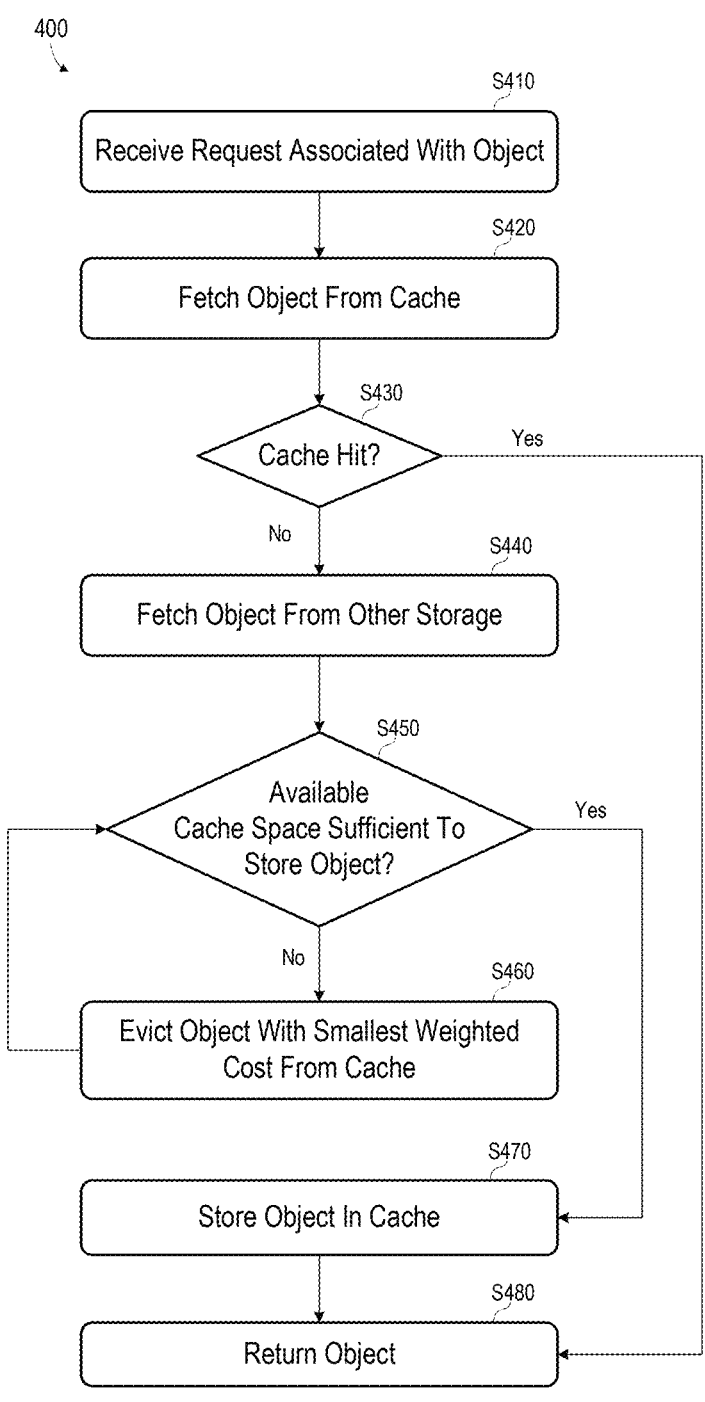
FIG. 4 is a flow diagram of a process to provide tenant-based cache eviction according to some embodiments.

FIG. 4 is a flow diagram of process 400 to provide tenant-based cache eviction according to some embodiments. Process 400 and the other processes described herein may be performed using any suitable combination of hardware and software. Program code embodying these processes may be stored by any non-transitory tangible medium, including a fixed disk, a volatile or non-volatile random-access memory, a DVD-ROM, a Flash drive, a magnetic tape, and solid-state Random-Access Memory (RAM) or Read Only Memory (ROM) storage, and may be executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, at S410, a request associated with an object is received by an application. In one example, a user operates a client device (e.g., a desktop computer) to execute a Web browser application. The user may select or otherwise input a Uniform Resource Locator (URL) associated with a cloud-based application, causing the Web browser to send a request to a cloud gateway corresponding to the URL. The request may include a security token and the cloud gateway may perform authentication and authorization using the token. For example, the gateway may authenticate the user as belonging to a particular tenant.

The received request is associated with an object. For example, the request may comprise a request to read an object or update an object. The request may be associated with more than one object but process 400 will be described with respect to one object for clarity.

In response to the request, the object is fetched from the cache at S420. Fetching the object from the cache may comprise sending a request for the object to a cache manager. If the object is currently stored in the cache, a cache hit returning the object is detected at S430 and the object is returned to the application at S480. If the object is not currently stored in the cache, a cache miss is detected at S430.

In response to the cache miss, the object is fetched from other storage at S440. The other storage may comprise a persistent database storage, in-memory storage which is slower to access than the cache, a remote storage system, or the like. Next, at S450, it is determined (e.g., by the cache manager) whether the cache includes enough available space to store the fetched object. If so, the object is stored in the cache at S470 and is returned to the application at S480.

Flow proceeds from S450 to S460 if the cache does not include enough available space to store the fetched object. At S460, an object which is stored in the cache and which is associated with the smallest weighted cost of all objects currently stored in the cache is evicted from the cache. S460 therefore includes determination of the object which is associated with the smallest weighted cost of all objects currently stored in the cache, and eviction of the object from the cache.

The cache manager may perform the determination of S460 by referring to statistics such as statistics 115. The determination of S460 may comprise identifying an object in statistics 115 which is associated with the smallest weighted cost. It is noted that the cache manager need not consider to which tenants the cached objects belong or the respective QoS levels of the tenants, since the weighted cost of each cached object factors in such information.

Eviction at S460 may comprise deletion, deallocation and/or any process which frees the cache space used by the identified object for use in storing another object. Flow then returns to S450 to again determine whether the cache includes enough available space to store the object fetched at S440. Flow therefore cycles between S450 and S460, identifying and evicting object from the cache until it is determined at S450 that the cache includes enough available space to store the fetched object. At this point, the object is stored in the cache at S470 and then returned to the application at S480.

The following are examples of weighted cost determinations according to some embodiments. The determinations assume two tenants, Tenant1 associated with QoS=4 and Tenant2 associated with QoS=3. Moreover, MAX_QOS=5, MAX_IDL_TIME=300 s, and $\gamma$=0.5.

In the first example, cached object obj1 belongs to Tenant1 and is associated with metrics $\Delta$time1=51 s, freq1=49, and loadTime1=1 s. Using the formula above, $\text{cost}_{w1}$=247. Cached object obj2 belongs to Tenant2, is stored in the cache is after obj1 is stored in the cache, and is associated with metrics $\Delta$time2=50 s, freq2=50, LoadTime2=1 s, resulting in $\text{cost}_{w2}$=153. Accordingly, between the two objects, obj2 would be selected for eviction at S460 since $\text{cost}_{w2} < \text{cost}_{w1}$.

Using FIFO, LRU, or LFU algorithms, obj1 may be selected for eviction over obj2. However, the above example illustrates a case in which the difference in tenant QoS levels overrides the difference in the usage metrics of the cached objects. As a result, the object belonging to the tenant associated with the greater QoS level is maintained in the cache, possibly providing improved performance to that tenant.

In another example, cached object obj3 belongs to Tenant1 and is associated with metrics $\Delta$time3=100 s, freq3=50, and loadTime3=1 s. Using the formula above, $\text{cost}_w3$=202. Cached object obj4 belongs to Tenant2, is stored in the cache is after obj1 is stored in the cache, and is associated with metrics $\Delta$time4=50 s, freq2=100, LoadTime2=1 s, resulting in $\text{cost}_{w2}$=307. Due to these weighted costs, obj3 would be selected over obj4 for eviction at S460. LRU and LFU algorithms may also select obj3 for eviction, since the difference in tenant QoS is not sufficient to override the difference in the usage metrics of the cached objects.

Figure 5:
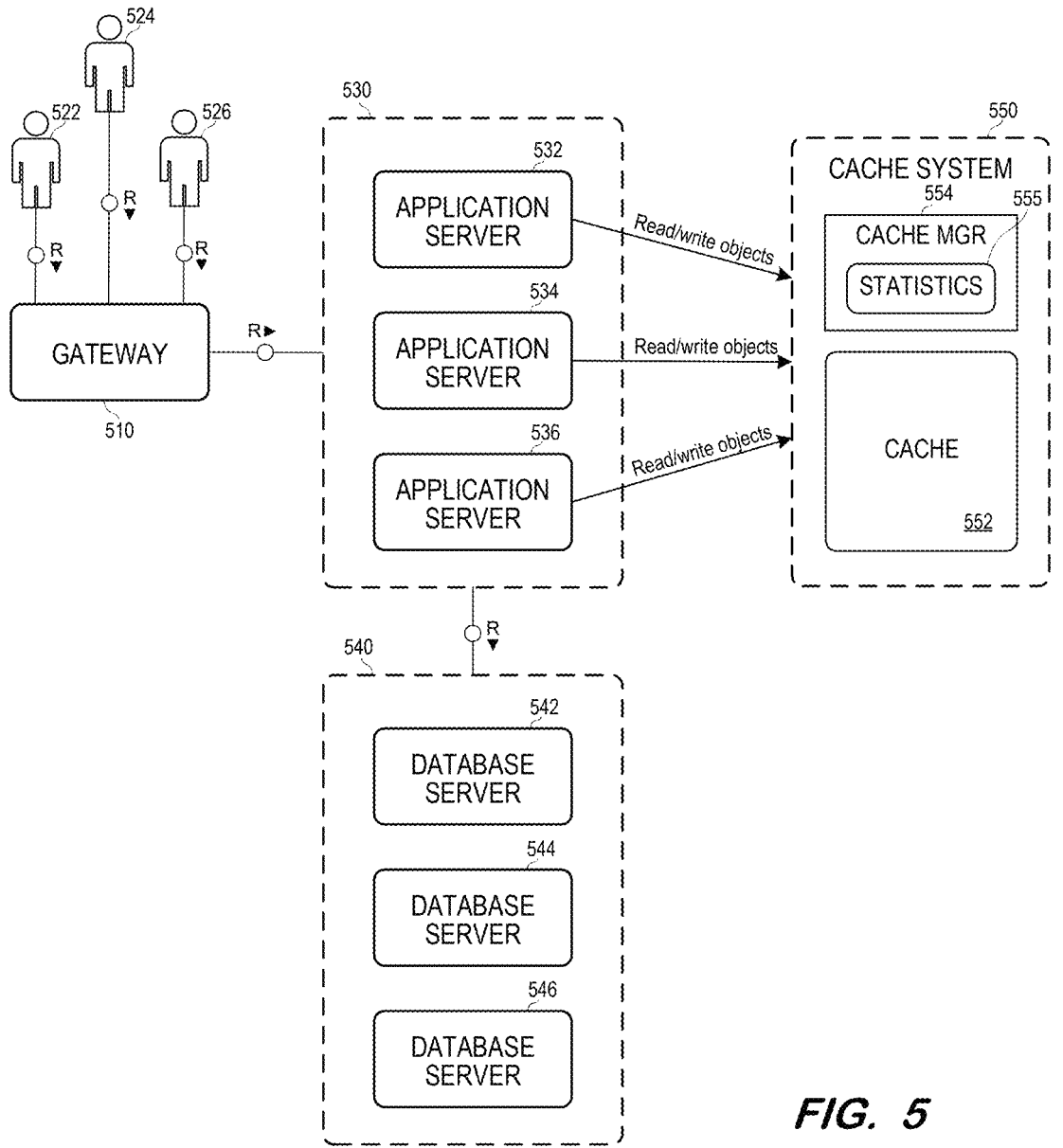
FIG. 5 illustrates an orchestration platform-based multi-tenant system providing tenant-based cache eviction according to some embodiments.

FIG. 5 illustrates an orchestration platform-based multi-tenant system providing tenant-based cache eviction according to some embodiments.

As mentioned above, gateway 510 may receive requests from users 522, 524 and 526 of disparate tenants. The requests may be associated with a multi-tenant application. Gateway 510 directs the requests to cluster 530 of server nodes 532, 534 and 536. As is known in the art, server nodes 532, 534 and 536 implement a container orchestration platform (e.g., Kubernetes) for execution of instances of the multi-tenant application. The application instances may access instances of a database application executing in cluster 540 of server nodes 542, 544 and 546. Each server node may comprise a virtual machine allocated by a cloud provider providing self-service and immediate provisioning, autoscaling, security, compliance and identity management features.

The application instances executing on server nodes 532, 534 and 536 access the database application instances executing on server nodes 542, 544 and 546 in order to create, read, update and delete objects belonging to the tenants of users 522, 524 and 526. These functions include reading and writing objects from and to shared cache 552 of cache system 550. Cache 552 may be an in-memory key-value distributed data store such as a Redis cache but embodiments are not limited thereto.

Cache manager 554 of cache system 550 maintains and updates statistics 555 as described above. In the FIG. 5 implementation, statistics 555 are affected by cache accesses of each application instance executing in cluster 520. For example, the LastAccess and AccessFreq values for a given object reflect all accesses of the object by each application instance. Cache manager 554 may determine a weighted cost of each object in cache 552 based on statistics 555 and tenant QoS levels as described above, in order to determine objects to evict from cache 552.

Figure 6:
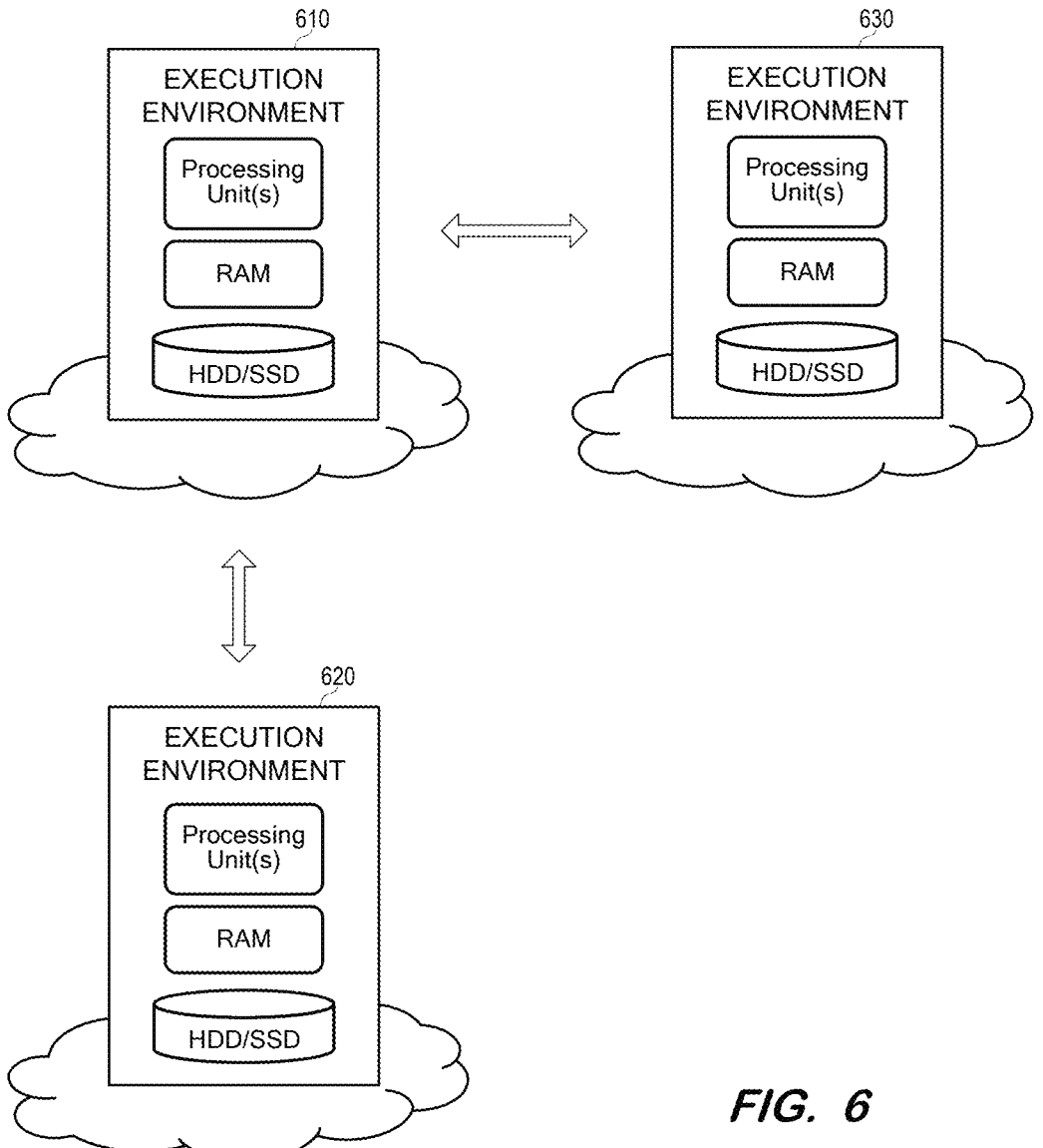
FIG. 6 illustrates a cloud-based architecture according to some embodiments.

FIG. 6 illustrates a cloud-based database deployment according to some embodiments. The illustrated components may comprise cloud-based compute resources residing in one or more public clouds providing self-service and immediate provisioning, autoscaling, security, compliance and identity management features.

Execution environments 610-630 may comprise servers or virtual machines of a Kubernetes cluster. Execution environments 610-630 may support containerized applications which provide one or more services to users. Execution environment 610 may execute a multi-tenant application, execution environment 620 may execute a database, and execution environment 630 may execute a cache system as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a cache storing a plurality of objects;
a memory storing executable program code; and one or more processing units to execute the executable program code to cause the system to:
determine, for each of the plurality of objects, a value based on an exponential function having an exponent including a quality of service level associated with a tenant to which the object belongs and on a linear function including an elapsed time since a last access to the object in the cache;
determine one of the plurality of objects to evict from the cache based on the determined values; and
evict the determined one of the plurality of objects from the cache.

2. The system of claim 1, the one or more processing units to execute the executable program code to cause the system to:
after the determined one of the plurality of objects is evicted from the cache, determine a second one of the plurality of objects to evict from the cache based on the determined values; and
evict the determined second one of the plurality of objects from the cache.

3. The system of claim 2, the one or more processing units to execute the executable program code to cause the system to:
determine, for each of the plurality of objects stored in the cache, a second value based on the exponential function having an exponent including the quality of service level associated with the tenant to which the object belongs and on the linear function including the elapsed time since a last access to the object in the cache;
determine one of the plurality of objects to evict from the cache based on the determined second values; and
evict the determined one of the second plurality of objects from the cache.

4. The system of claim 3, wherein the value for each of the plurality of objects is determined based on a frequency of accesses of the object.

5. The system of claim 1, the one or more processing units to execute the executable program code to cause the system to:
determine, for each of a second plurality of objects stored in the cache, a second value based on the exponential function having an exponent including the quality of service level associated with a tenant to which the object belongs and on the linear function including an elapsed time since a last access to the object in the cache;
determine one of the second plurality of objects to evict from the cache based on the determined values; and
evict the determined one of the second plurality of objects from the cache.

6. The system of claim 1,
wherein the object is accessed in the cache by a plurality of application instances.

7. The system of claim 1, wherein the value for each of the plurality of objects is determined based on a frequency of accesses of the object.

8. A method comprising:
storing a plurality of objects in a cache;
determining, for each of the plurality of objects, a value based on an exponential function having an exponent including a quality of service level associated with a tenant to which the object belongs and on a linear function including an elapsed time since a last time at which the object was accessed from the cache;
determining one of the plurality of objects to delete from the cache based on the determined values; and deleting the determined one of the plurality of objects from the cache.

9. The method of claim 8, further comprising:

after deleting the determined one of the plurality of objects from the cache, determining a second one of the plurality of objects to evict from the cache based on the determined values; and deleting the determined second one of the plurality of objects from the cache.

10. The method of claim 9, further comprising:

determining, for each of the plurality of objects stored in the processor memory, a second value based on the exponential function having an exponent including the quality of service level associated with the tenant to which the object belongs and on the linear function including the elapsed time since a last time at which the object was accessed from the cache;

determining one of the plurality of objects to deleted from the cache based on the determined second values; and deleting the determined one of the second plurality of objects from the cache.

11. The method of claim 8, further comprising:

determining, for each of a second plurality of objects stored in the cache, a second value based on the exponential function having an exponent including the quality of service level associated with a tenant to which the object belongs and the linear function including the elapsed time since a last time at which the object was accessed from the cache;

determining one of the second plurality of objects to delete from the cache based on the determined values; and deleting the determined one of the second plurality of objects from the cache.

12. The method of claim 8, wherein the value for each of the plurality of objects is determined based on a frequency of accesses of the object.

13. One or more non-transitory computer-readable media storing program code executable by a computing system to cause the computing system to perform operations comprising:

storing a plurality of objects in a cache;

determining, for each of the plurality of objects, a value based on an exponential function having an exponent including a quality of service level associated with a tenant to which the object belongs and on a linear function including an elapsed time since a last time at which the object was accessed from the cache;

determining one of the plurality of objects to delete from the cache based on the determined values; and deleting the determined one of the plurality of objects from the cache.

14. The one or more non-transitory computer-readable media of claim 13, further comprising:

determining, for each of the plurality of objects stored in the processor memory, a second value based on the exponential function having an exponent including the quality of service level associated with the tenant to which the object belongs and on the linear function including the elapsed time since a last time at which the object was accessed from the cache;

determining one of the plurality of objects to delete from the cache based on the determined second values; and deleting the determined one of the second plurality of objects from the cache.

15. The one or more non-transitory computer-readable media of claim 13, wherein the value for each of the plurality of objects is determined based on a frequency of accesses of the object.

* * * * *